United States Patent
Valinejadshoubi et al.

(10) Patent No.: US 10,627,134 B2
(45) Date of Patent: Apr. 21, 2020

(54) KINETIC DOUBLE SKIN FAÇADE CONFIGURATED FOR PROVIDING HEATED AIR, AND NATURAL VENTILATION

(71) Applicants: Masoud Valinejadshoubi, Mazandaran (IR); Mannan Ghanizadehgrayli, Mazandaran (IR); Masoud Rasoulilarmaeie, Mazandaran (IR)

(72) Inventors: Masoud Valinejadshoubi, Mazandaran (IR); Mannan Ghanizadehgrayli, Mazandaran (IR); Masoud Rasoulilarmaeie, Mazandaran (IR)

(*) Notice: Subject to any disclaimer, the term of this patent is extended or adjusted under 35 U.S.C. 154(b) by 366 days.

(21) Appl. No.: 15/602,074

(22) Filed: May 22, 2017

(65) Prior Publication Data

US 2017/0261234 A1    Sep. 14, 2017

(51) Int. Cl.
| | | |
|---|---|---|
| *E04D 13/18* | (2018.01) | |
| *F24S 20/63* | (2018.01) | |
| *F24F 7/013* | (2006.01) | |
| *F24F 5/00* | (2006.01) | |
| *F24S 30/425* | (2018.01) | |
| *F24F 7/00* | (2006.01) | |

(52) U.S. Cl.
CPC ............ *F24S 20/63* (2018.05); *F24F 5/0075* (2013.01); *F24F 7/013* (2013.01); *F24S 30/425* (2018.05); *F24F 2005/0082* (2013.01); *F24F 2007/004* (2013.01); *Y02A 30/26* (2018.01); *Y02B 10/20* (2013.01); *Y02B 30/92* (2013.01); *Y02E 10/44* (2013.01); *Y02E 10/47* (2013.01)

(58) Field of Classification Search
CPC ............. F24S 20/60; F24S 20/63; F24S 20/66

USPC .......... 126/621, 628–629, 701–703; 454/278
See application file for complete search history.

(56) References Cited

U.S. PATENT DOCUMENTS

| | | | | |
|---|---|---|---|---|
| 3,243,117 | A * | 3/1966 | Morgan | E04B 1/76 237/1 R |
| 4,232,731 | A * | 11/1980 | Kaplow | F24S 60/00 165/48.2 |
| 7,575,001 | B2 | 8/2009 | Kaiser | |
| 8,359,689 | B2 | 1/2013 | Warren et al. | |
| 8,863,741 | B2 | 10/2014 | MacKay et al. | |
| 9,206,997 | B2 | 12/2015 | Ryan | |
| 9,429,340 | B2 | 8/2016 | Snyder et al. | |
| 2007/0199562 | A1* | 8/2007 | Doherty | F24S 10/502 126/647 |
| 2013/0165037 | A1* | 6/2013 | Casey | F24F 13/15 454/318 |

* cited by examiner

*Primary Examiner* — Vivek K Shirsat
(74) *Attorney, Agent, or Firm* — NovoTechIP International PLLC

(57) ABSTRACT

An improved solar heater and ventilator device is disclosed. In one embodiment, the solar heater and ventilator system is a multi-functional device that can be used in a variety of ways to provide heat, produce and store electricity, and provide natural ventilation. In one embodiment, the device is comprised of a main frame, multiple columns of interconnected movable cubes and a distributor panel. Through the interconnected movable cubes, the solar heater and ventilator system can easily switch functionalities between a solar heater and a ventilator and cooling system. The device is easy and inexpensive to operate, as it does not require any external electricity, and its functionalities can be changed with simple touches of buttons.

16 Claims, 17 Drawing Sheets

CLOSE
"SOLAR AIR HEATER"

OPEN
"NATURAL VENTILATION"

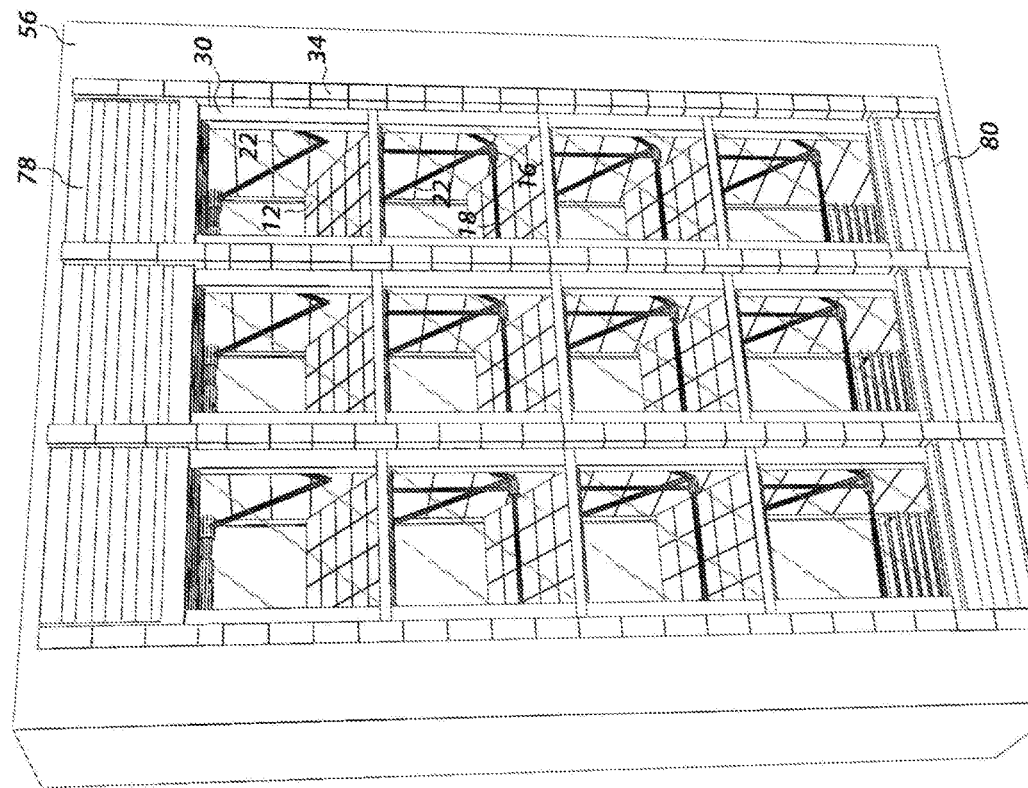
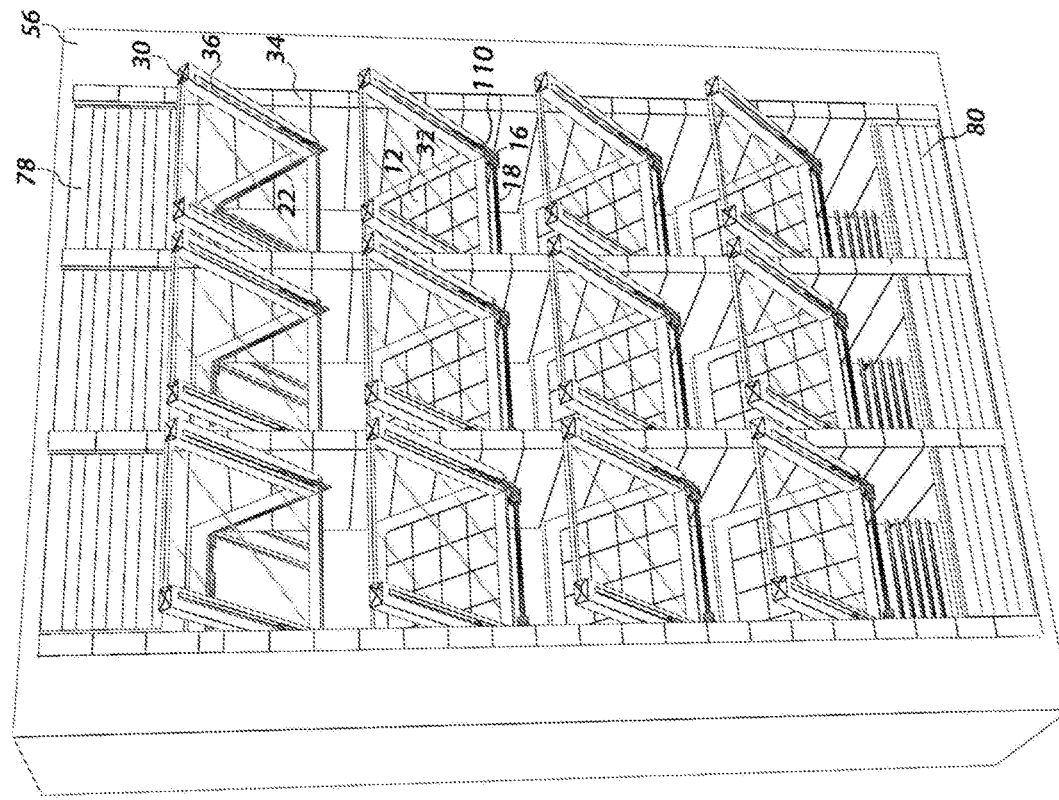

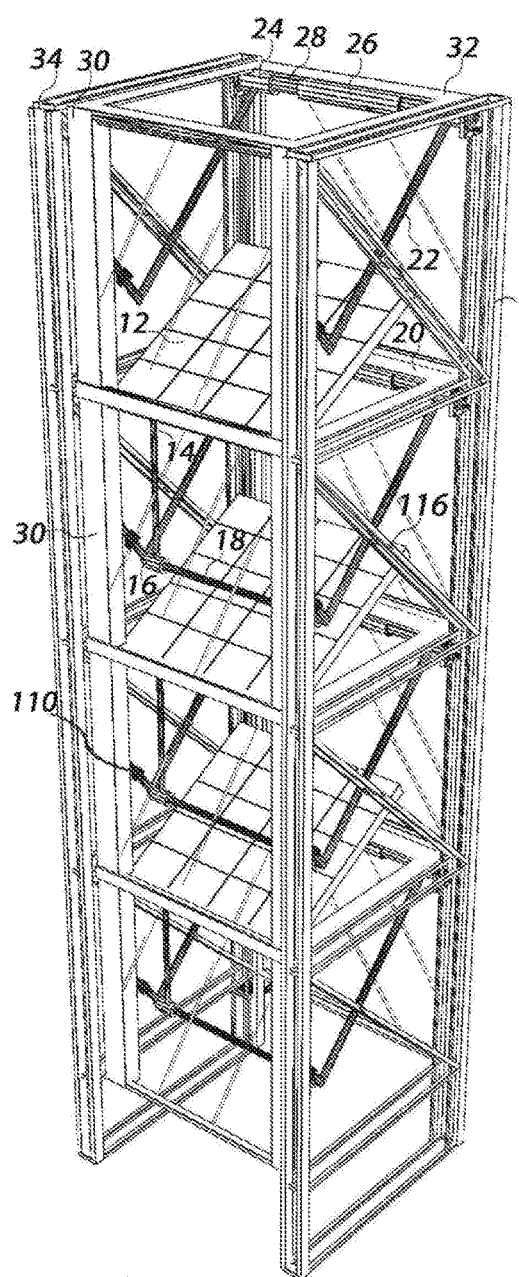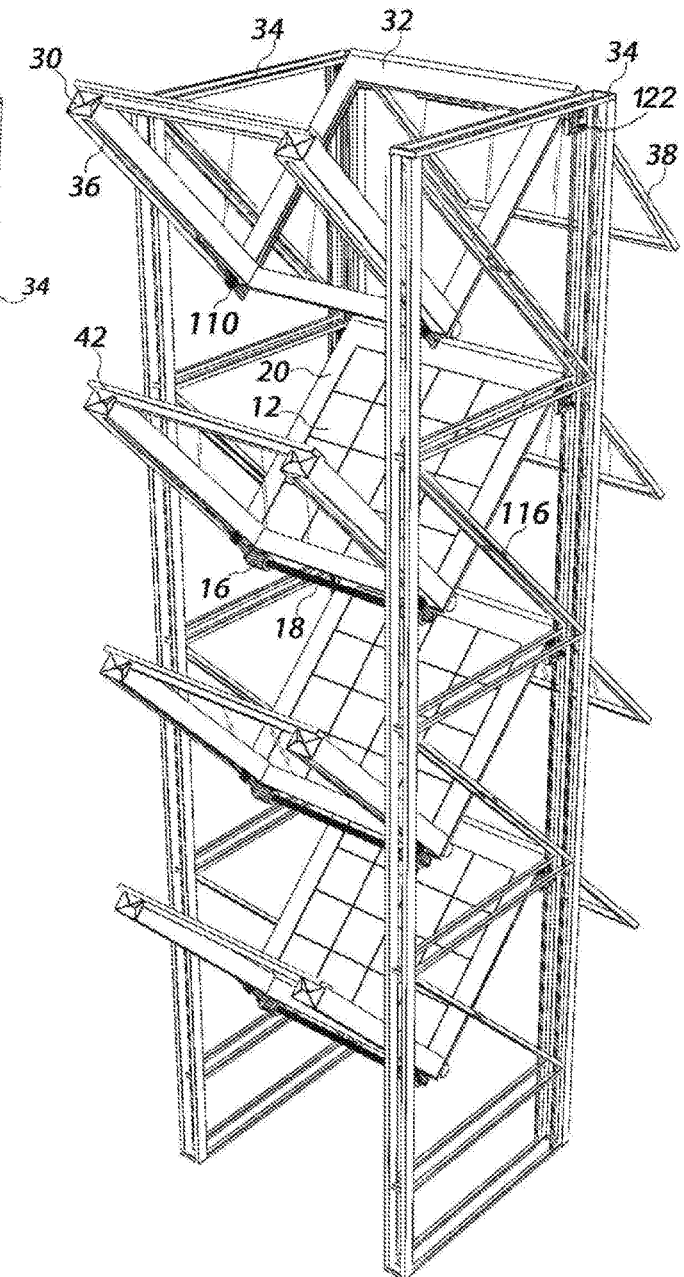
FIG.3A
CLOSE
"SOLAR AIR HEATER"
FIG.3B
OPEN
"NATURAL VENTILATION"

CLOSE
"SOLAR AIR HEATER"

OPEN
"NATURAL VENTILATION"

CLOSE
"SOLAR AIR HEATER"

OPEN
"NATURAL VENTILATION"

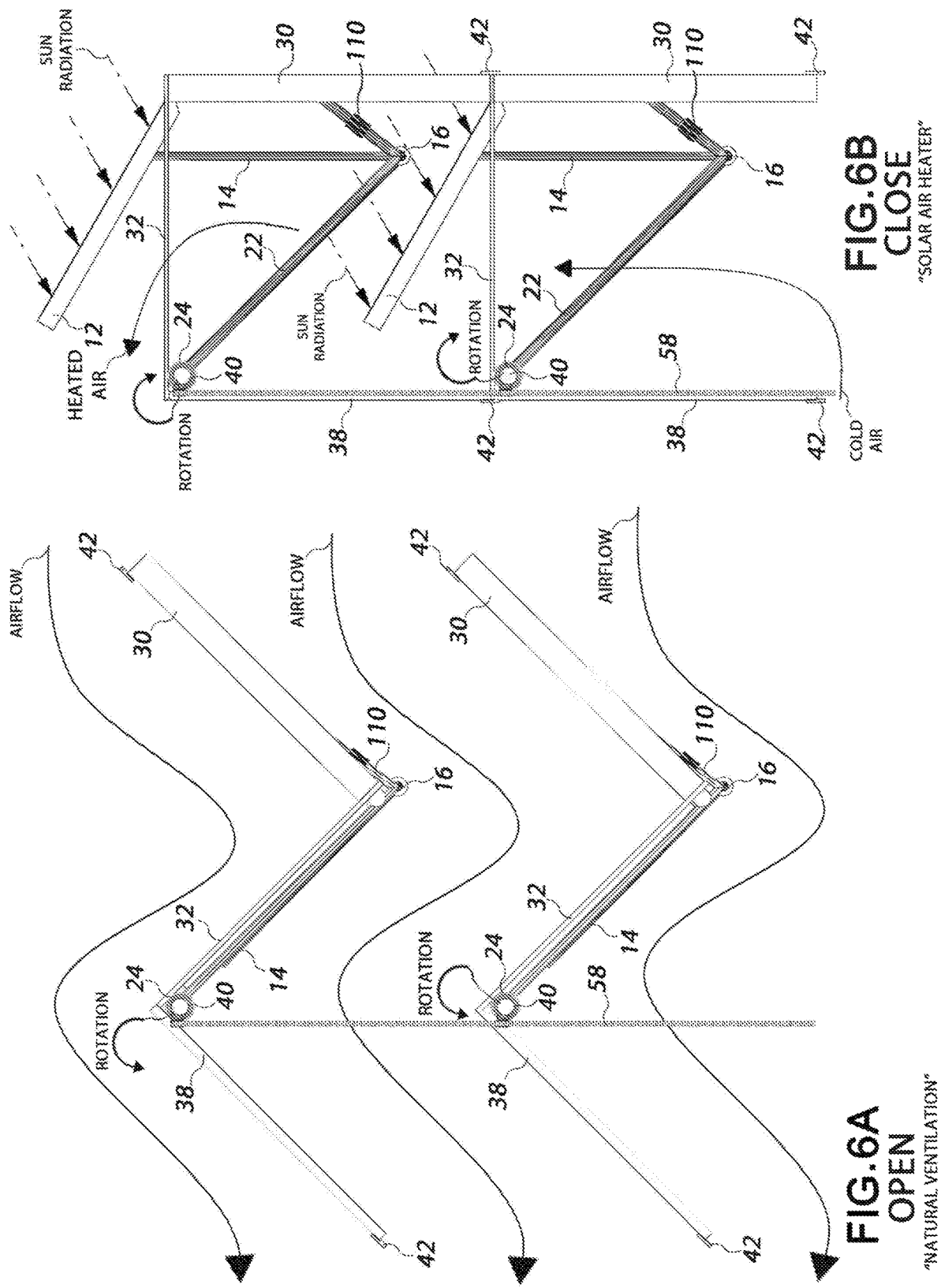

OPEN SECTION

CLOSE
SECTION

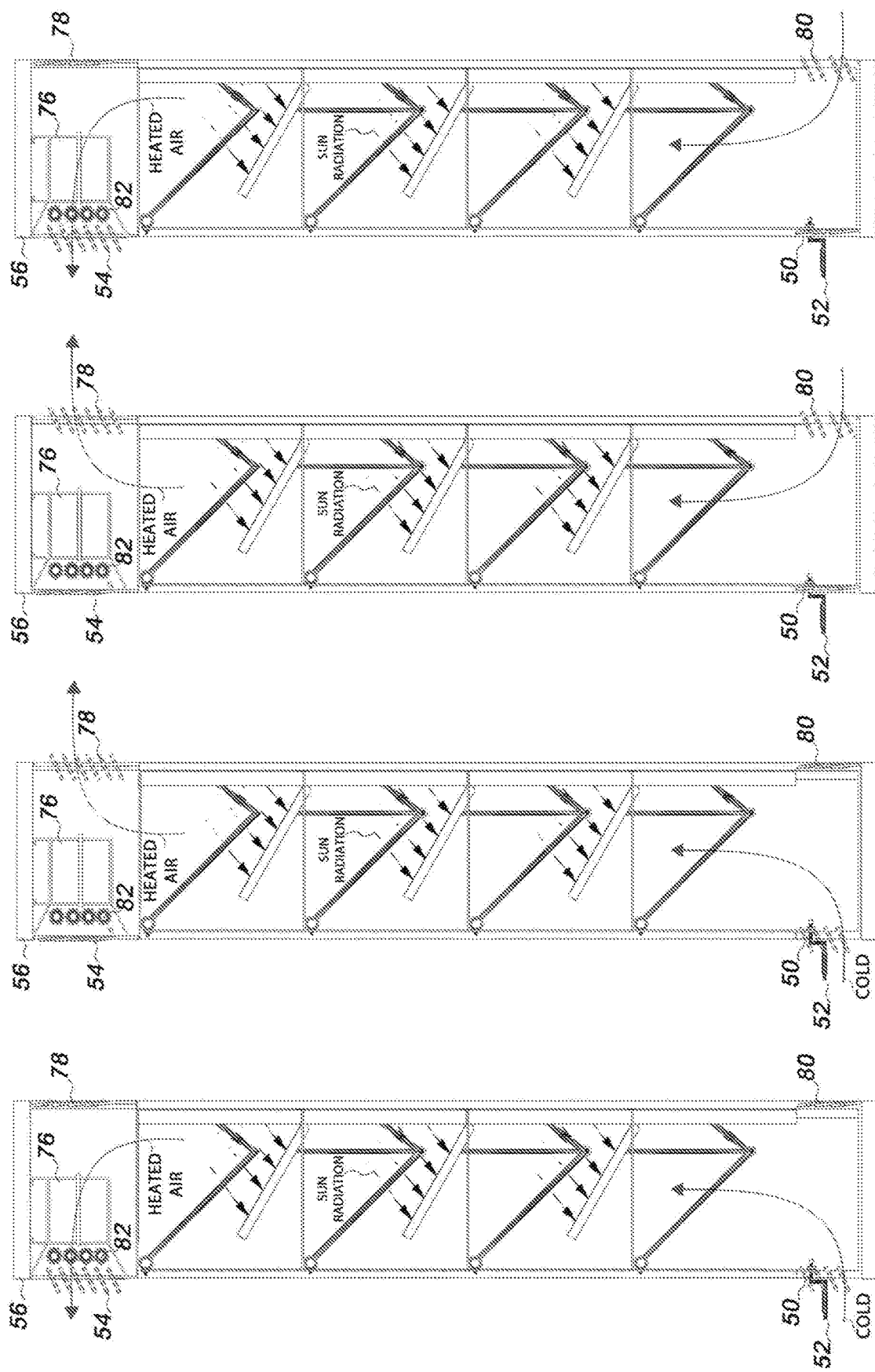

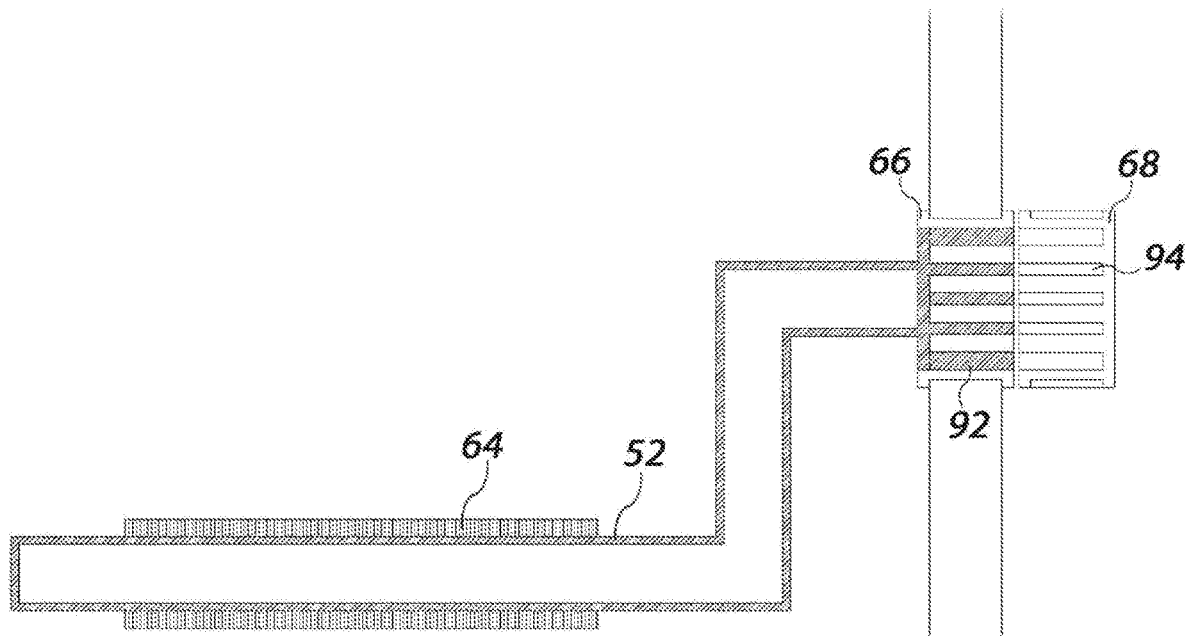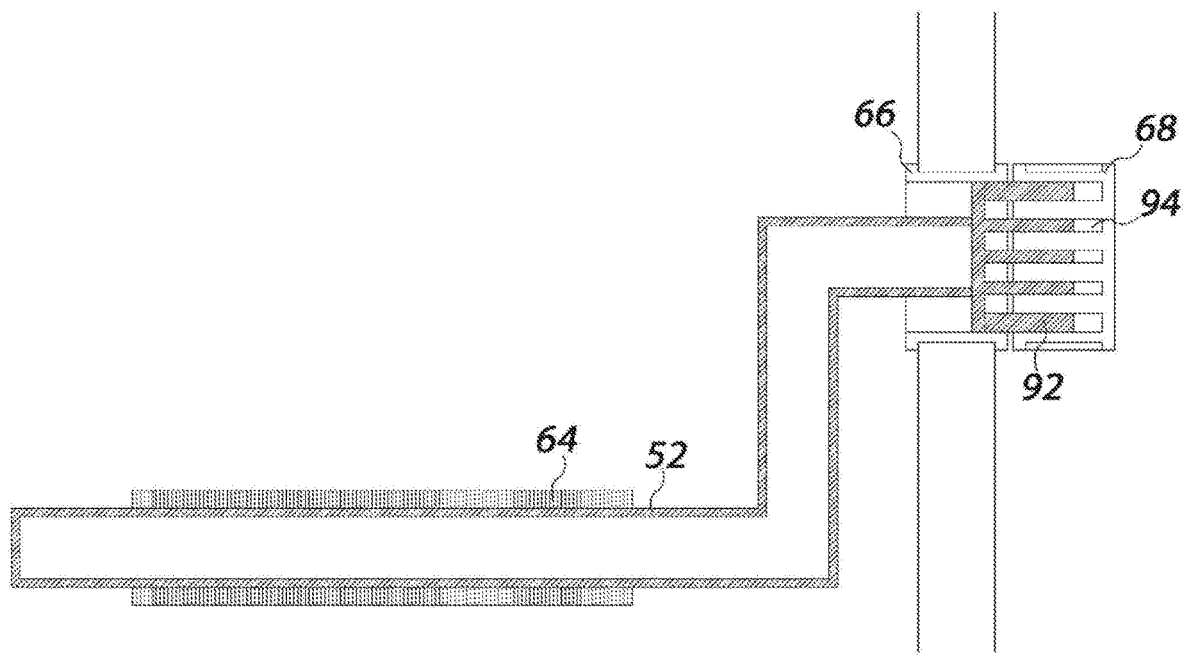
FIG.9
SECTION

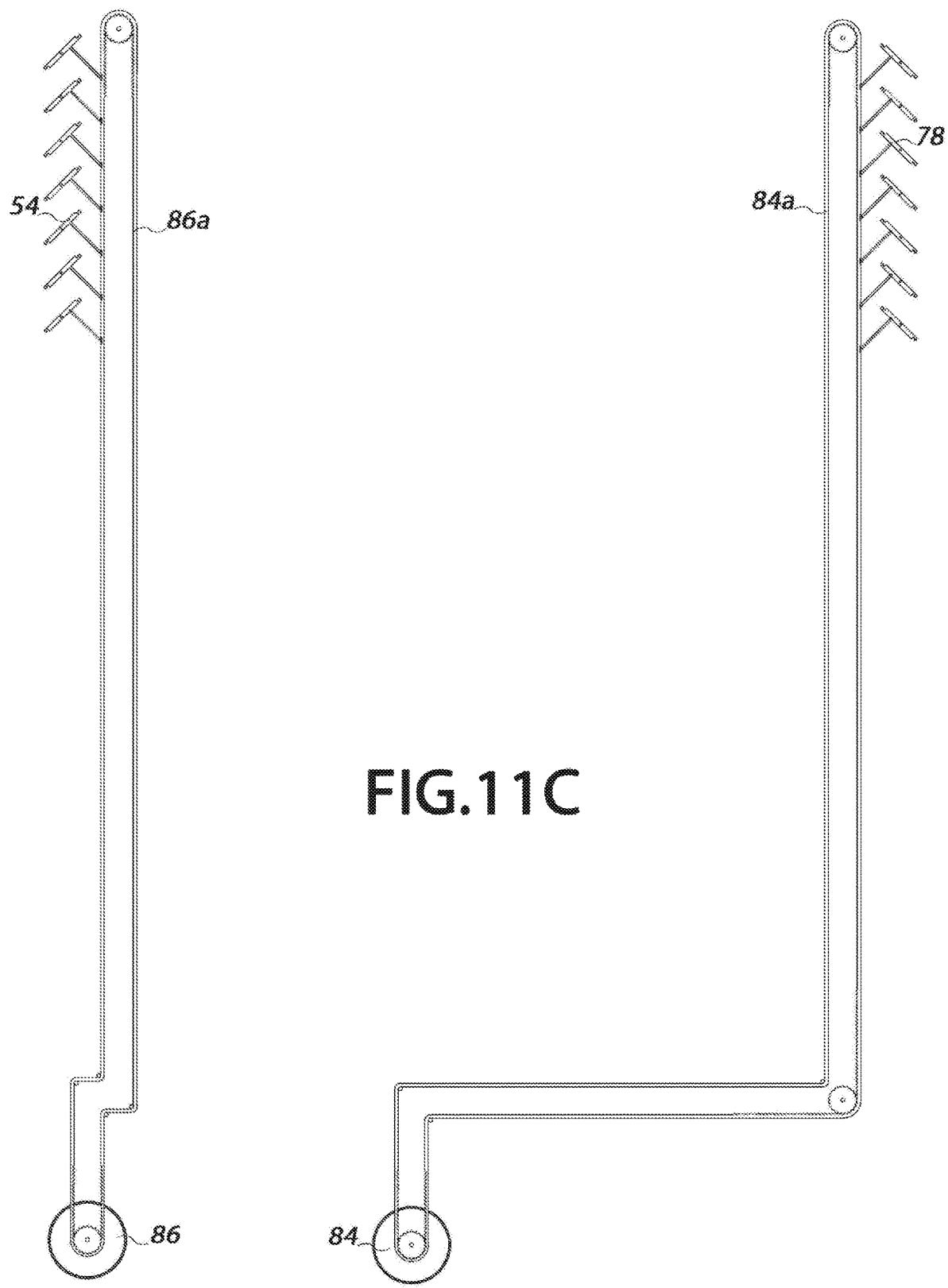

KINETIC DOUBLE SKIN FAÇADE CONFIGURATED FOR PROVIDING HEATED AIR, AND NATURAL VENTILATION

CROSS REFERENCE TO RELATED APPLICATION

This application claims the benefit of priority to an Iran patent application having serial number 139550140003002416, which was filed on May 23, 2016, and is incorporated by reference herein in its entirety.

TECHNICAL FIELD

The present application relates generally to a solar air heater, and more particularly, to a modular movable kinetic double skin façade configured to produce solar energy for heating air and to provide natural ventilation.

BACKGROUND

Solar heaters have gained popularity in recent years due their environmentally efficient manner of providing heat and because of the low energy costs associated with their use. Most currently available solar air heaters operate by converting sunlight to heat within a glass or plastic covered enclosure. The heat is then trapped in the enclosure by the glass or plastic and released into the building as desired.

In general, solar heaters are economical to build or buy and require minimal energy costs to operate, as energy from the sun is free. As such, these devices provide an easy inexpensive method of using the energy of the sun to augment heating of homes and other buildings. However, currently available solar heaters are yet to be widely used. One of the reasons for this may be that the available systems do not address how they can be integrated into a building and used alongside other heating or cooling systems. For example, most prior art devices do not take into account how they affect the amount of sunlight that enters the building. A lot of the solar heaters block windows. As a result, these devices prevent sunlight from coming in and also block the view of the residents. Moreover, current systems can be improved to address not only heating, but also other related issues such as ventilation.

Therefore, a need exists for providing an improved solar heater that is easy to use and integrate into a building and offers solutions that address heating and more.

SUMMARY

The instant application describes a multi-functional solar heater and ventilator which in one embodiment includes a main frame, a plurality of rotatable cubes, each rotatable cube comprising a rotatable collector and one or more glass panels, and a distributor panel. In one embodiment, the main frame houses the plurality of rotatable cubes, the rotatable collector is configured to generate heat, and the rotatable cubes are configured to create a closed internal space for heating and an open passageway for ventilation.

BRIEF DESCRIPTION OF THE DRAWINGS

Features of the subject technology are set forth in the appended claims. However, for purpose of explanation, several implementations of the subject technology are set forth in the following figures.

FIG. 2A-2B illustrate schematic drawings of the side of an improved multi-functional solar air heater and natural ventilator unit facing the outdoors, when the unit is being used as a ventilator and a solar air heater, respectively, according to an implementation.

FIGS. 3A-3B illustrate schematic drawings of one of the columns of connected cubes forming the improved multi-functional solar air heater and natural ventilator unit, when the unit is being used as a solar air heater and a ventilator, respectively, according to an implementation.

FIGS. 6A-6B illustrate schematic drawings of the flow of air through two connected cubes of the improved multi-functional solar air heater and natural ventilator unit, according to an implementation.

FIGS. 8A-8E illustrate schematic drawings of a side view of one column of connected cubes of the improved multi-functional solar air heater and natural ventilator unit showing various configurations for vents and air flow through them when the unit is providing heated air, according to an implementation.

FIG. 9 illustrates a schematic drawing of interlocking gears of the improved multi-functional solar air heater and natural ventilator unit according to an implementation.

FIGS. 11A-11E illustrate schematic drawings of the internal mechanisms for opening and closing one or more vents of the improved multi-functional solar air heater and natural ventilator unit, according to an implementation.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. As part of the description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

Solar heaters are very useful in augmenting a building's heating system in an efficient low cost manner. However, most currently available solar heaters only provide heat without addressing other related issues. For example, they may block windows thereby acting as a visual barrier and preventing sunlight from entering a building.

A solution is proposed here to solve these issues and more by providing an improved system that offers heating, natural ventilation, sunlight, purifying the heated air, and producing and storing electric energy. In, one embodiment, the system also provides acoustic and thermal insulation of windows. Heat can be provided during the cold months by using absorbent surfaces that heat the air. Cooling and ventilation can be provided when it is hot outside by changing the shape of the system and creating a more shaded area inside the building.

Figure 1B:
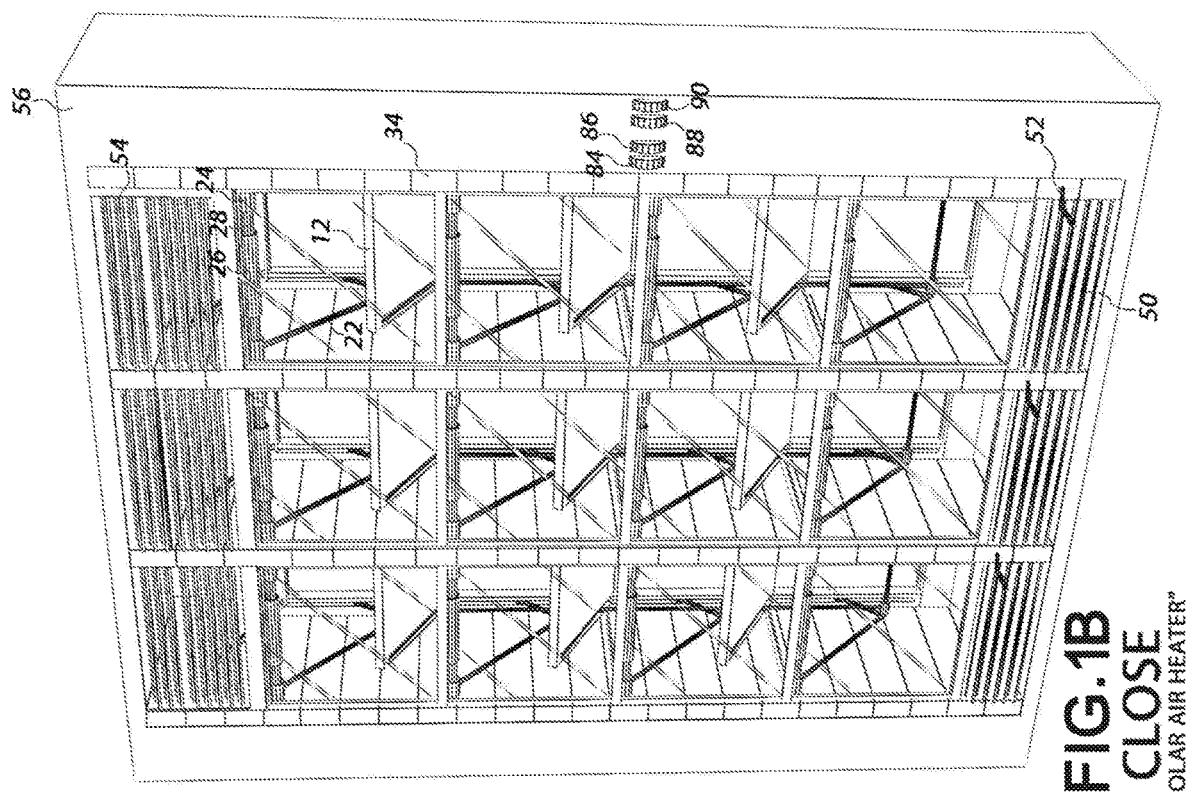
FIGS. 1A-1B illustrate schematic drawings of the side of an improved multi-functional solar air heater and natural ventilator unit facing inside the building, when the unit is being used as a ventilator and a solar air heater, respectively, according to an implementation.
Figure 1A:
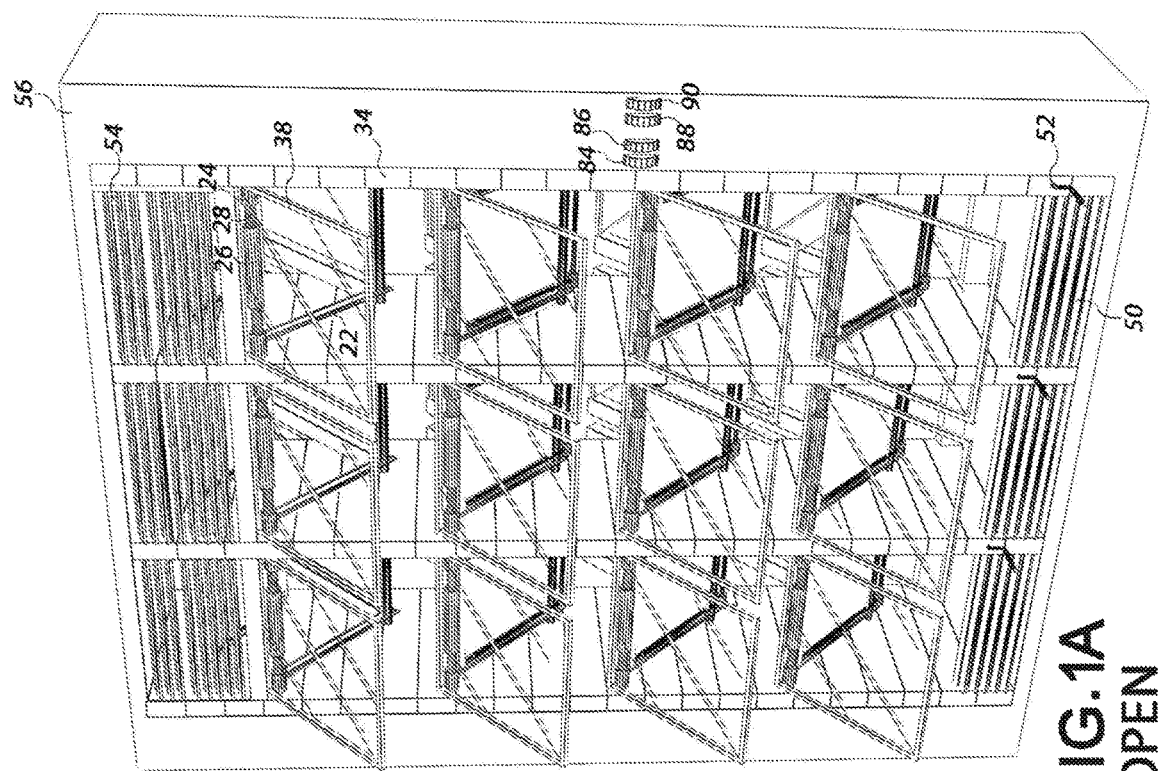

In one embodiment, the improved multi-functional solar heater and ventilator is a window type unit such as the units shown in FIGS. 1A-1B and 2A-2B. In a preferred embodiment of the present disclosure, the improved solar heater and ventilator is installed in a building in a similar manner as a window. FIGS. 1A-1B illustrate the side of the solar heater and ventilator unit that is positioned inside the building, while FIGS. 2A-2B illustrate the side that faces the outdoors. As shown in these figures, the solar heater and ventilator unit provides at least two different utilities, natural ventilation and solar air heater. FIGS. 1A sand 2A show the structure of the solar heater and ventilator unit when it operates as a natural ventilator, while FIGS. 1B and 2B illustrate the structure when the unit operates as a solar heater. Natural ventilation can be used when the weather is warm, thereby allowing the air inside the building to ventilate and in one embodiment create a natural breeze for cooling. In the other hand, the solar heater can be used when it is cold for heating the inside air.

Figure 7:
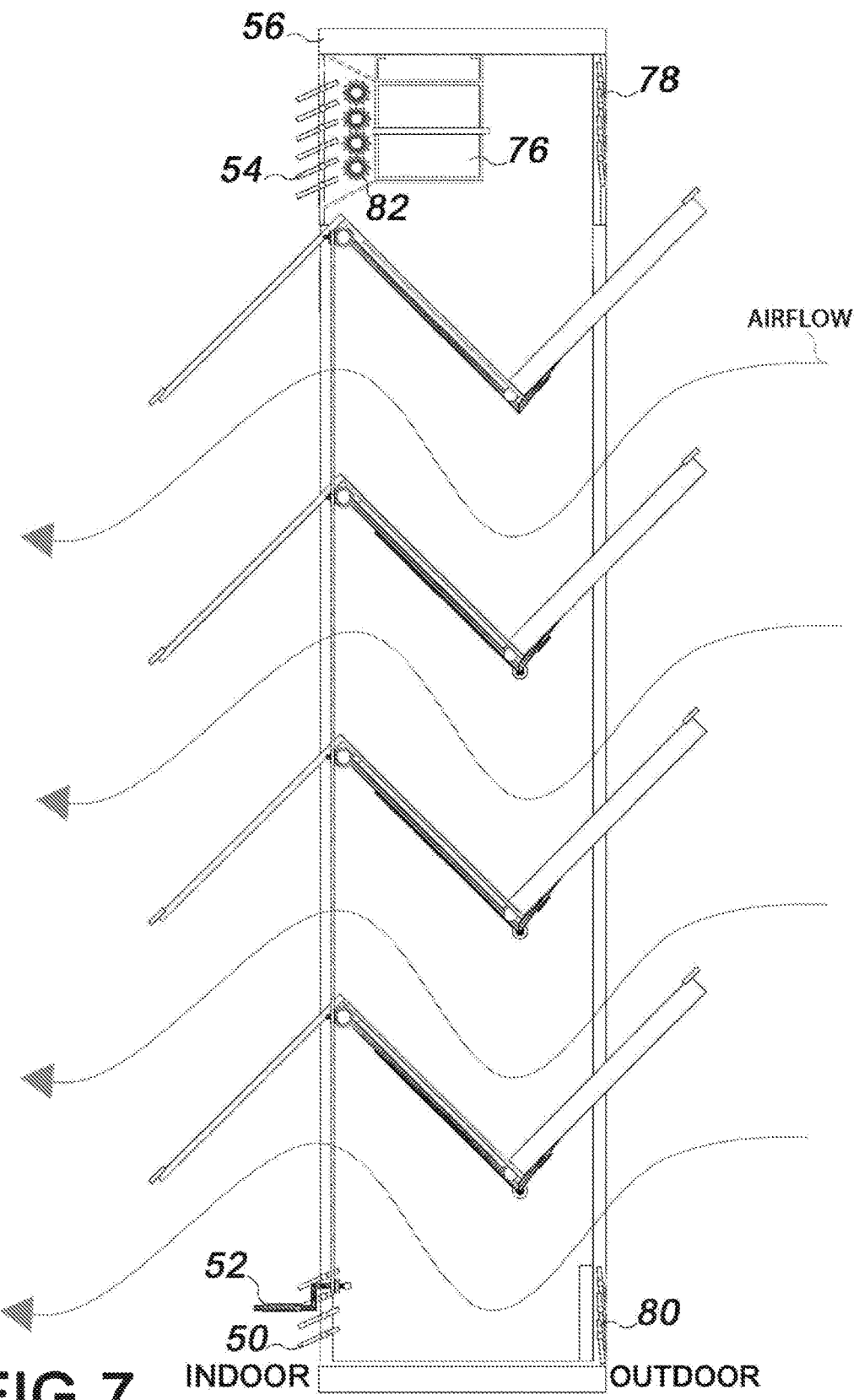
FIG. 7 illustrates a side view of one column of connected cubes of the improved multi-functional solar air heater and natural ventilator unit when it is providing ventilation, according to an implementation.
Figure 8A:
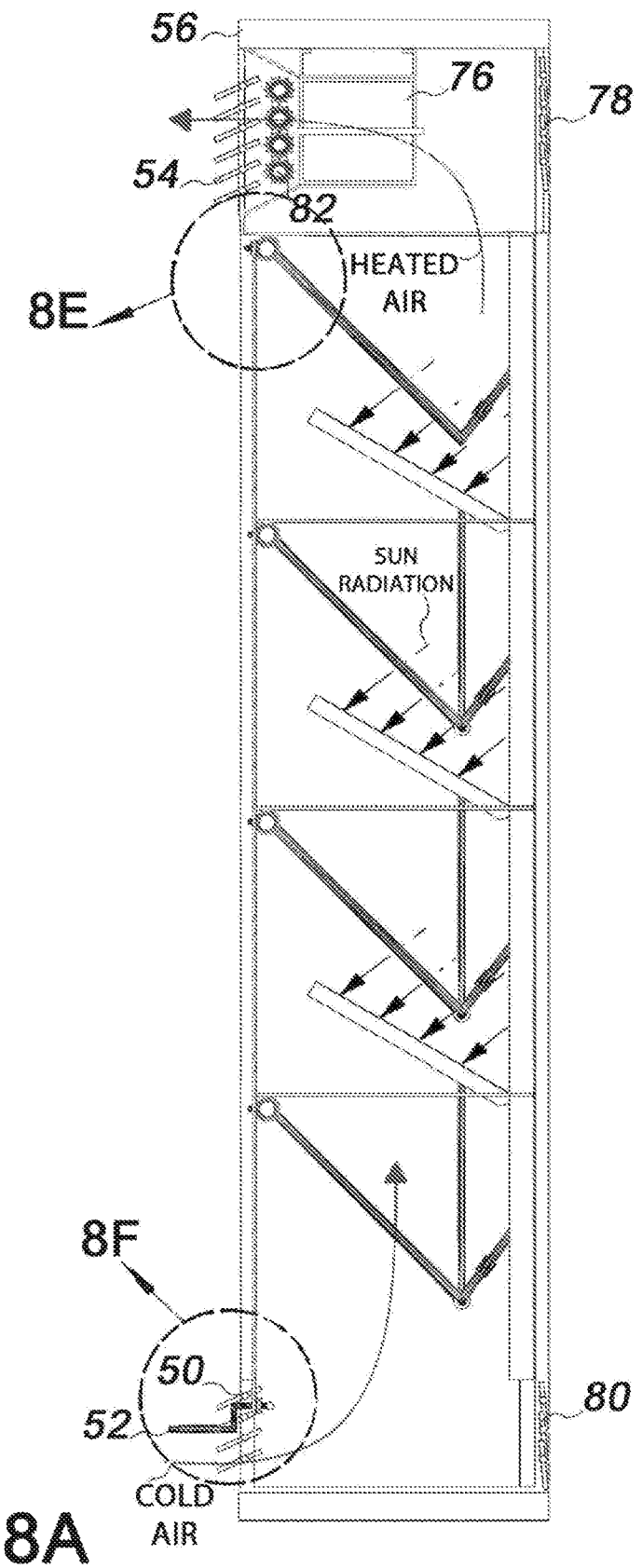

In one embodiment, the improved solar heater and ventilator unit is composed of three main parts: a plurality of connected cubes, a main frame 56, and a distributor panel (illustrated in FIGS. 7 and 8A). Each of these parts is discussed in detail below.

Figure 4B:
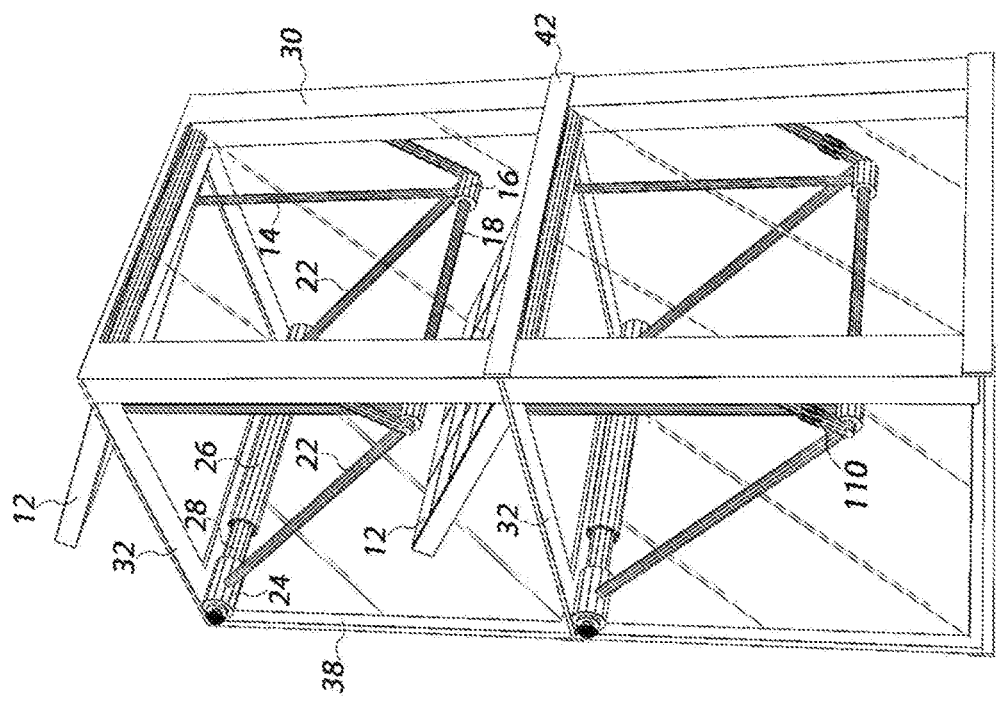
FIGS. 4A-4B illustrate schematic drawings of the side of two connected cubes facing the outdoors, when the improved multi-functional solar air heater and natural ventilator unit is being used as a ventilator and a solar air heater, respectively, according to an implementation.
Figure 4A:
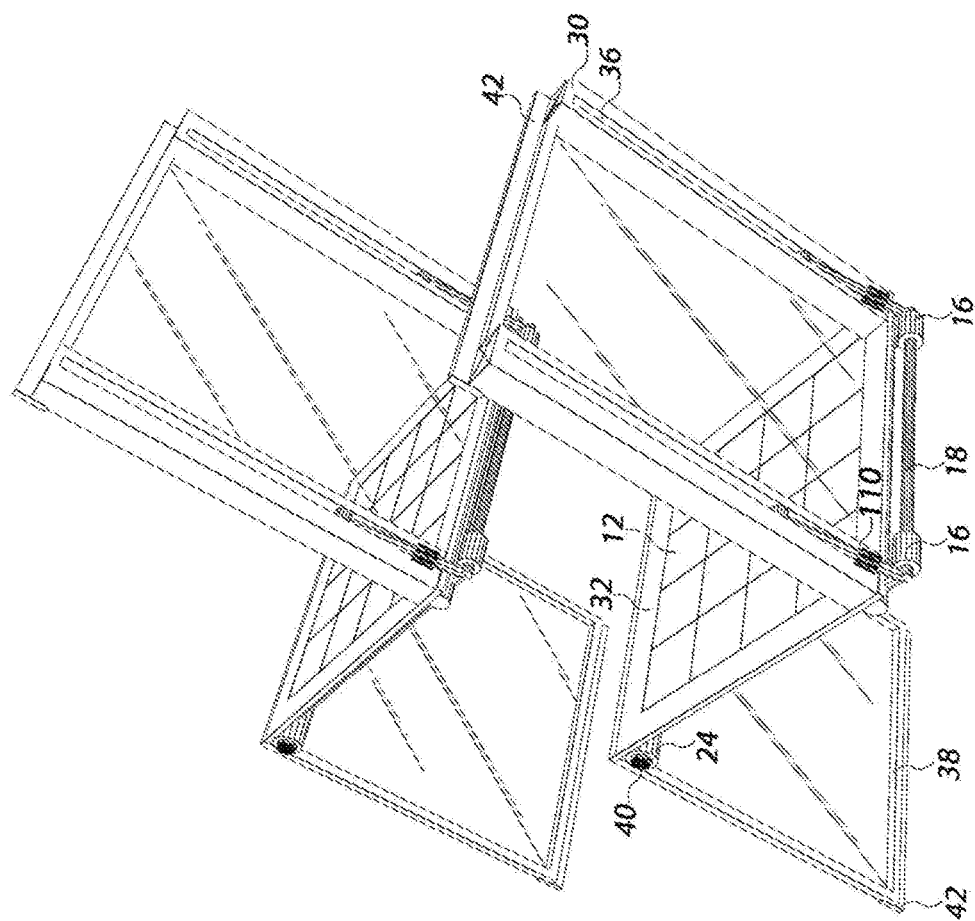

FIGS. 4A-4B illustrate, more closely, the internal structure of each connected cube in one embodiment. As shown, each of the plurality of connected cubes includes two glass panels, one in front and one in the back and a collector 12 positioned in between the two glass panels. In one embodiment, the collector 12 is made from an absorbent surface that collects and/or stores heat and solar energy of the sun. In one embodiment, the collector 12 is a photovoltaic material made from solar cells. The collector 12 is movable such that it can be positioned approximately horizontally when needed, thus preventing the surface from absorbing the sun's energy when heating is not needed. This is illustrated in FIG. 4A. As shown, a frame 32 houses the collector 12 when in the horizontal position. On the other hand, when it is cold and the unit is operating as a heater, the collector can be moved away from the frame 32 to a diagonal position to maximize absorption of energy. The glass panels are also formed such that they can create a closed protected environment inside the cube that prevents cold air from getting in (shown in FIG. 6B). Each glass panel facing the inside of the building is housed within an inner window panel 38 and each glass panel facing the outside is housed within an outer window panel 30.

FIG. 6A illustrates the flow of air through two of the connected cubes when the unit is operating as a natural ventilator. As shown, air can easily flow around the rotated cubes from the outside into the building, thus creating a natural breeze inside the building.

Figure 5B:
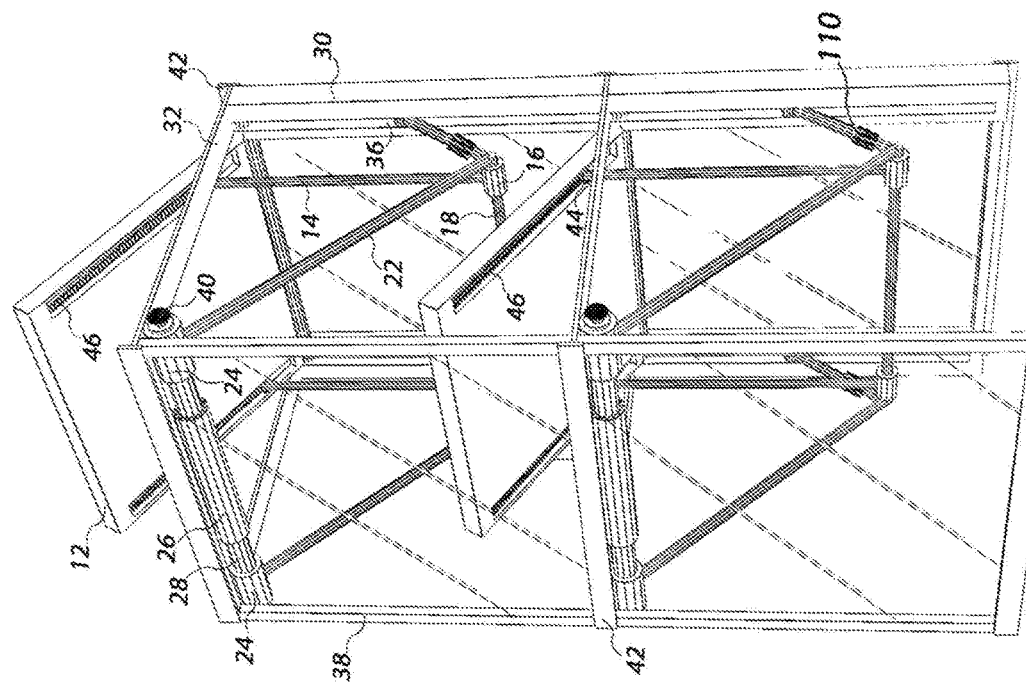
FIGS. 5A-5B illustrate schematic drawings of the side of the two connected cubes facing inside the building, when the improved multi-functional solar air heater and natural ventilator unit is being used as a as a ventilator and a solar air heater, respectively, according to an implementation.
Figure 5A:
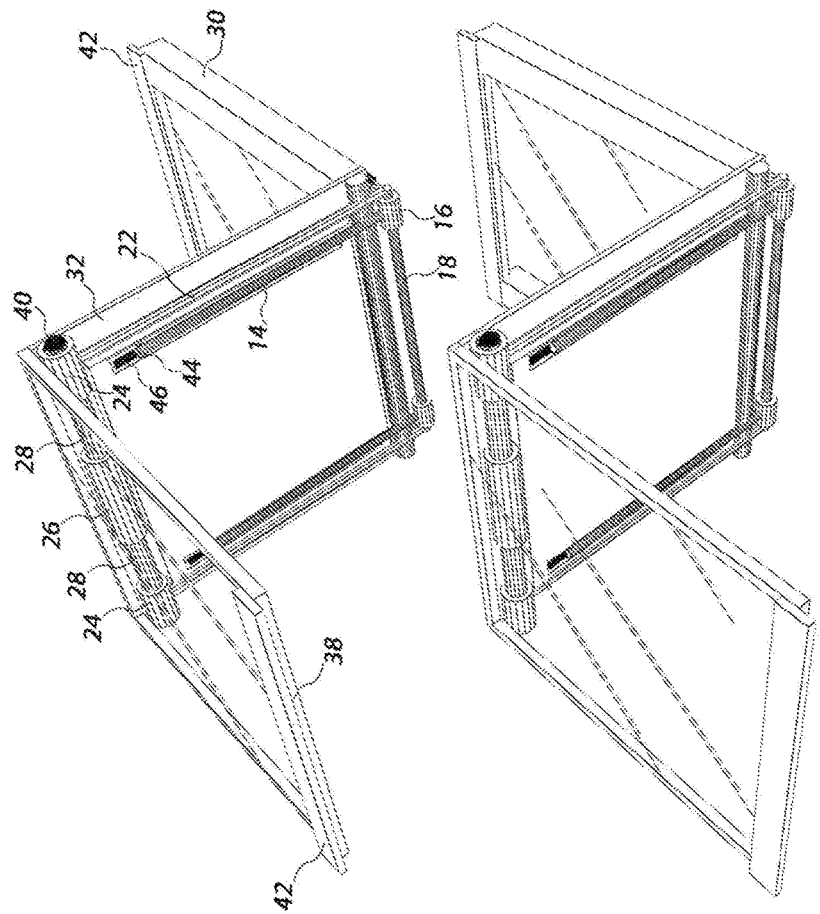

In a preferred embodiment of the present disclosure, the collector 12 can change positions through a mechanism illustrated more clearly in FIGS. 5A-5B. This mechanism includes two levers 14, two L-shaped levers 22 and rod 28. As shown in FIG. 5B, the two levers 14 are positioned underneath the collector 12 on each opposing end. When the collector 12 is in a diagonal position, the two levers 14 are in a vertical position holding the collector 12 in place. The levers 14 are movable within two cavities 46, which are formed underneath the surface of the collector 12. As shown in FIG. 5A, the two levers 14 can move into and lay flat within each of the cavities 46 to move the collector 12 into a horizontal position. This is because, in one embodiment, the cavities 46 contain a railing inside that helps move the levers 14. Alternatively, the cavities 46 contain a spring-type device that enables the movement of the levers 14 inside the cavities 46. In one embodiment, the one end of each lever 14 that moves inside the cavities 46 is attached to a wheel-shaped unit 44 that helps keep the lever 14 inside the cavity 46 and also enables it to move smoothly inside the cavity 46. Each lever 14 is connected to a rod 18 via a cylinder 16. The cylinder 16 enables rotation of the lever 14 over the rod 18. The rod 18 is in turn connected to a corresponding L-shaped lever 22. The two L-shaped levers 22 are made, in one embodiment, from metal rods and are each connected on one side to a hollow cylinder 24. One side of the L-shaped levers 22 is connected to rods 116 which in turn connect the levers 22 to two outer vertical metal frames 34 (shown in FIGS. 3A-3B). The other side of the each of the two L-shaped levers 22 is positioned inside a cavity 36 formed inside the outer window panel 30. The L-shaped lever 22 is movable inside the cavity 36 such that it can fit into and lay flat inside the cavity 36 thereby moving the collector 12 into a horizontal position and closing the window panels. The two L-shaped levers on each side of the cube are also connected to each other through a rod 18. Each of the cavities 46 and 36 contain a railing inside through which the levers can easily move. In one embodiment, a damper 110 is used inside the cavity 36. When the cube is moving, the damper 110 increases in length thus allowing the unit to have the flexibility to change shape. The hollow cylinders 24 house a rod 28 which is one of the mechanisms responsible for moving each cube into a desired vertical or horizontal position. The rod 28 is housed within and connected to a tube 26. In one embodiment, the rod 28 is not rotatable inside the tube 26. The tube 26 is in turn connected to the inner window panel 38 thus moving the window panel 38 and as a result the entire cube when the rod 28 moves. The main support units for the rod 28 in each cube are two outer vertical metal frames 34 (shown in FIG. 3B) that are positioned on the two outer sides of each cube. The frames 34 keep the rod 28 in place with a brace 122 on each side and allow the rod 28 to rotate as needed. At each end of the rod 28, there is a gear 40. A belt 58 (shown in FIG. 10) located inside the frame 34 can rotate around the gear 40, thus coordinating the movement of a plurality of cubes. A siding 42 covers the borders in between the cubes to create a sealed environment and prevent cold air from getting in when the windows are closed.

Figure 8F:
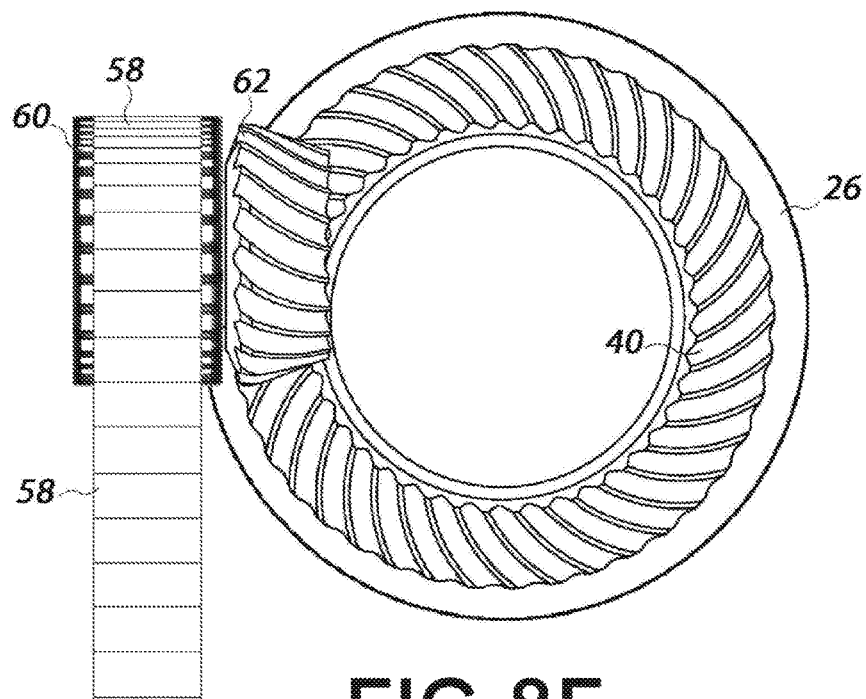
FIGS. 8F-8G illustrate schematic drawings of gears of the improved multi-functional solar air heater and natural ventilator unit, according to an implementation.
Figure 10:
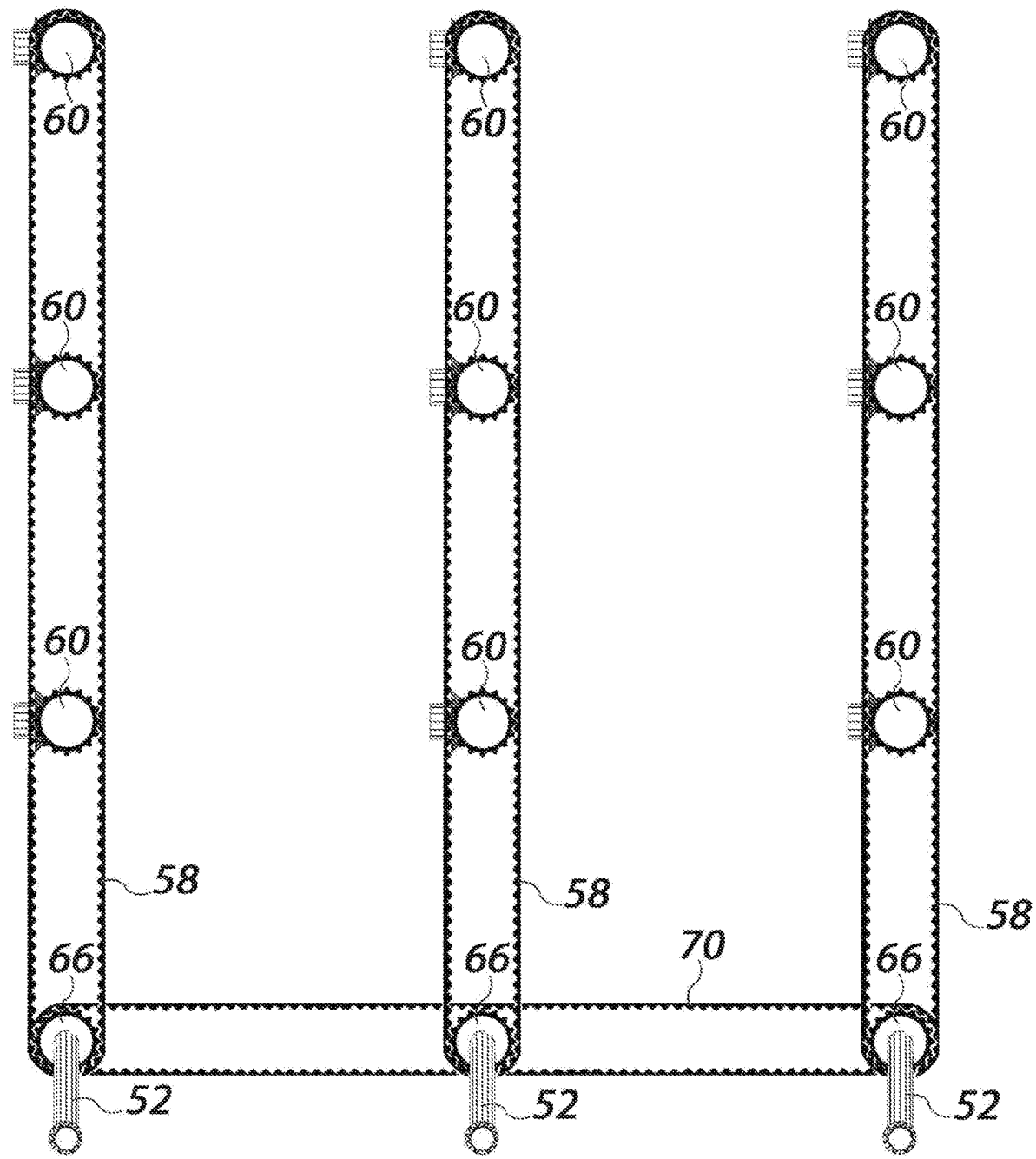
FIG. 10 illustrates a schematic drawing showing some of the plurality of gears and belts that are a part of the improved multi-functional solar air heater and natural ventilator unit, according to an implementation.

In one embodiment, the improved multi-functional solar heater and ventilator can be turned from a solar heater to a ventilator and vice versa easily by rotating the handles 52 (shown in FIGS. 1A-1B and 10). As FIGS. 1A-1B show, in one embodiment, each one of the vertical sets of cubes has its own handle 52 located at the bottom of the cubes. As illustrated in FIG. 10, when each handle 52 is rotated, it causes a gear 66 to rotate which in turn results in the belt 58 moving. Movement of the belt 58 causes each of the plurality of gears 60 that are connected to the respective belt 58 to also rotate. FIG. 8F shows that each of the gears 60 are engaged with one of the gears 40. Thus, when a gear 60 rotates, a corresponding gear 40 which is engaged with the gear 60 rotates as well. Because each gear 60 and its corresponding gear 40 do not have the same axis of rotation, a hypoid gear 62 is used, in one embodiment, in between each gear 60 and its corresponding gear 40. As discussed before, each of the gears 40 is connected to a rod 28. Thus, when the gears 40 rotate, they cause the rods 28 to move thus moving the window panels 38 and as a result each cube connected to the moving window panels. When a cube rotates around its central axis, the ends of the two L-shaped levers that is attached to the cylinders 24 remain in place as the L-shaped levers are stationary which respect to the rod 28. As a result, the other ends of the two L-shaped levers get either pulled or pushed, depending on the direction of the rotation, inside the railing of the cavities. This movement causes the two levers 14 to also move inside the railing of the cavities 46, thus moving the entire cube. Thus, by rotating the handles 52 in one direction, the user can close all the window panels and their attached cubes in the vertical set and by rotating the handle in the opposite direction the user can open the respective window panels for cooling and ventilation. In one embodiment, a soft cover 64 is positioned over each of the handles 52 to enable the user to rotate the handles easier.

Figure 8G:
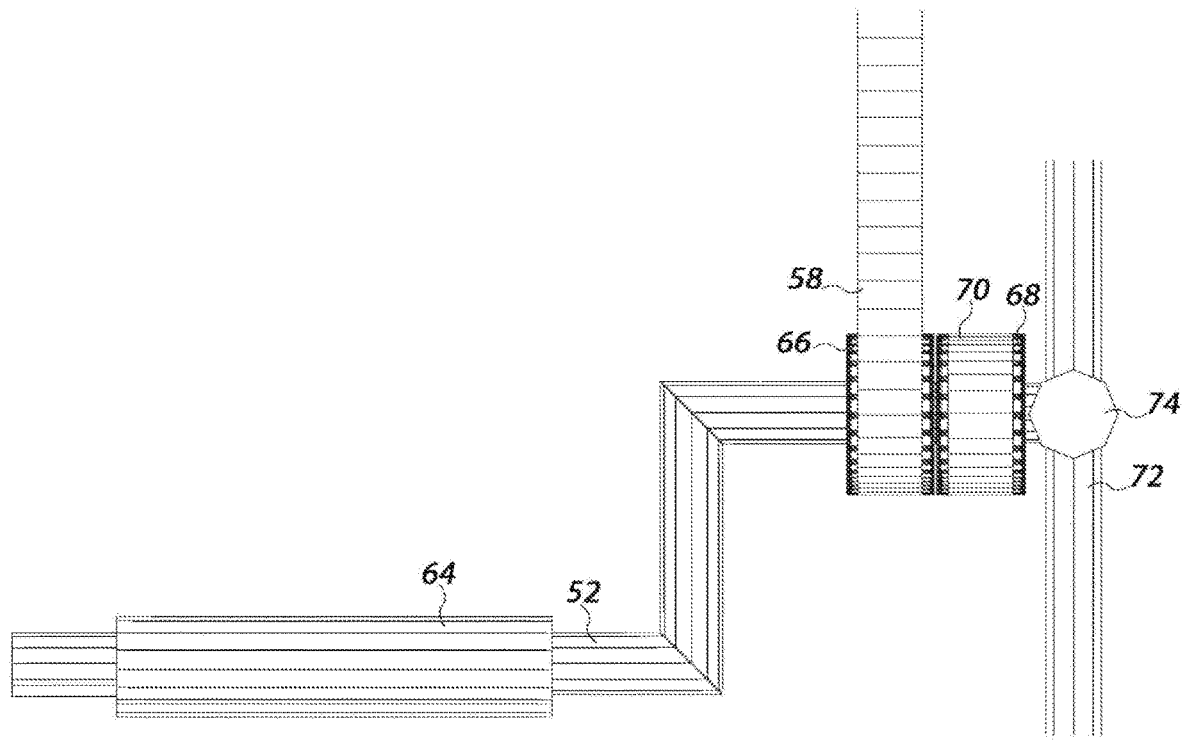

In one embodiment of the present invention, the improved solar heater and ventilator can turn from a solar heater to a ventilator and vice versa in at least two different ways. One method would involve the user rotating each one of the handles 52 individually to either close the window panels for a respective set of cubes or to open them. Alternatively, the user may close or open window panels for more than one set of cubes by rotating only one handle 52. This is made possible because as shown in FIG. 10, a horizontal belt 70 connects all rotators 66 and as a result all handles 52. In one embodiment, simultaneous opening and closing of the window panels for different sets can occur through a mechanism shown in FIGS. 8G and 9. As shown, each gear 66 is adjacent to a gear 68 which houses and rotates the belt 70. FIG. 9 illustrates how the gear 66 includes protruding teeth 92 which can fit into and interlock with openings 94 of the gear 68 thus attaching the two gears. This occurs in one embodiment, by pressing the handle 52 to forward to push the protruding teeth 92 into the openings 94. Once they interlock, rotating the handle 52 would result in rotating the gear 66 and the gear 68 which would in turn rotate the belt 70. When the belt 70 begins moving all gears 68 starting moving. This causes all other gears 66 that are also interlocked with their respective gears 68 to being rotating thus opening or closing their respective window panels for their cube set.

In one embodiment, the main frame 56 (shown in FIG. 1B) of the improved solar heater and ventilator is made from U.P.C.C. and forms the main structure of the device. The main frame 56 can include multiple parts. For example, in one embodiment, the main frame includes two structural frame 34 (shown in FIG. 3A), the handles 52, and a plurality of vents 50, 54, 78 and 80 (shown in FIG. 8A). In one embodiment, the structural frames 34 are structures that are positioned vertically in two opposing sides of each sets of vertical cubes to keep all of the cubes in place in a vertical position.

In one embodiment, the vents 50, 54, 78 and 80 provide flexibility and enable the multi-functional abilities of the device. FIGS. 8B-8D illustrate how by closing and/or opening each of these vents the functionalities of the device can change. For example, as illustrated in FIG. 8B, the device can be utilized solely as a heater by opening the bottom internal vents 50 and the top internal vents 54. In this manner, cold air from inside the building enters the device, moves through the various cubes and their absorbent surfaces and as a result gets heated before leaving the device through the top vents 54 and entering the building again.

FIG. 8C illustrates how the device can be used as a solar chimney by using the principles of thermal buoyancy. In one embodiment, this is done by opening the internal bottom vents 50 and the external top vents 78 and keeping the external bottom vents 80 and the internal top vents 54 closed. In this configuration, air will enter the device through the internal bottom vents 50 and gets heated by moving up through the cubes. This creates a kind suction causing the air to move up and out of the device through the top external vents 78, thus creating a ventilation system.

FIG. 8D shows a configuration where because the weather outside it too hot and/or a central air conditioning unit is operating to bring down the indoor temperature, ventilation is not appropriate. As a result, both internal vents 50 and 54 are closed while the two external vents 78 and 80 are kept open. In this manner, hot air does not enter the building, but air is allowed to pass through the external bottom vent 80 through the plurality of cubes and escape from the external top vent 78. In this configuration, the device is only used to produce and store electricity.

FIG. 8E illustrates the use of the improved solar heater and ventilator as both a heater and a ventilator simultaneously. This is applicable in cases where even though heating is needed, ventilation is also required. In such cases, the external bottom vents 80 and the internal top vents 54 are opened, while the internal bottom vents 50 and the external top vents 78 are closed. This causes cold air to enter through the external bottom vents 80, pass through the absorbent surfaces of the cubes to heat up and enter the building through the internal top vents 54. This configuration provides both ventilation and heating.

Figure 11A:
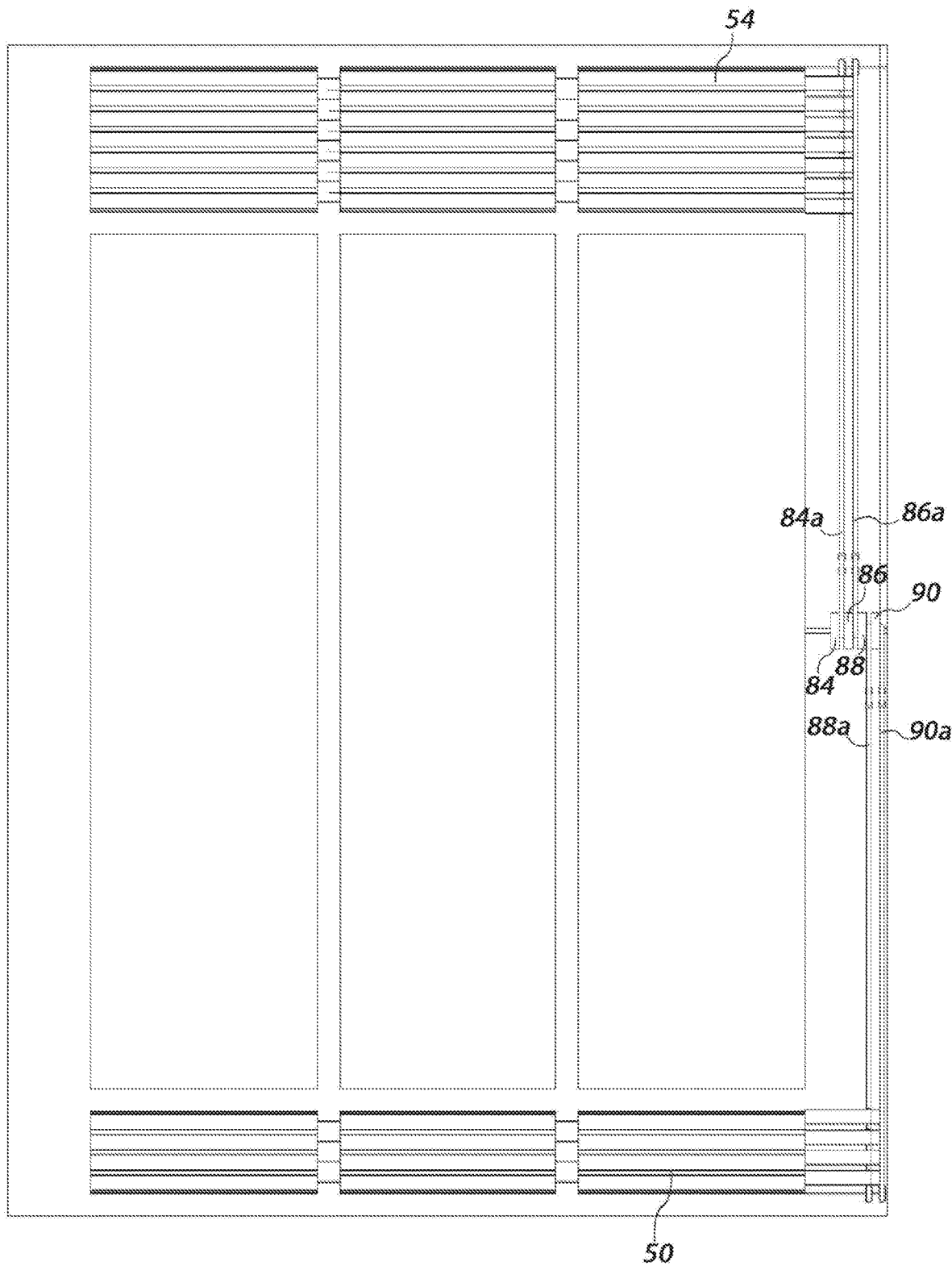
Figure 11B:
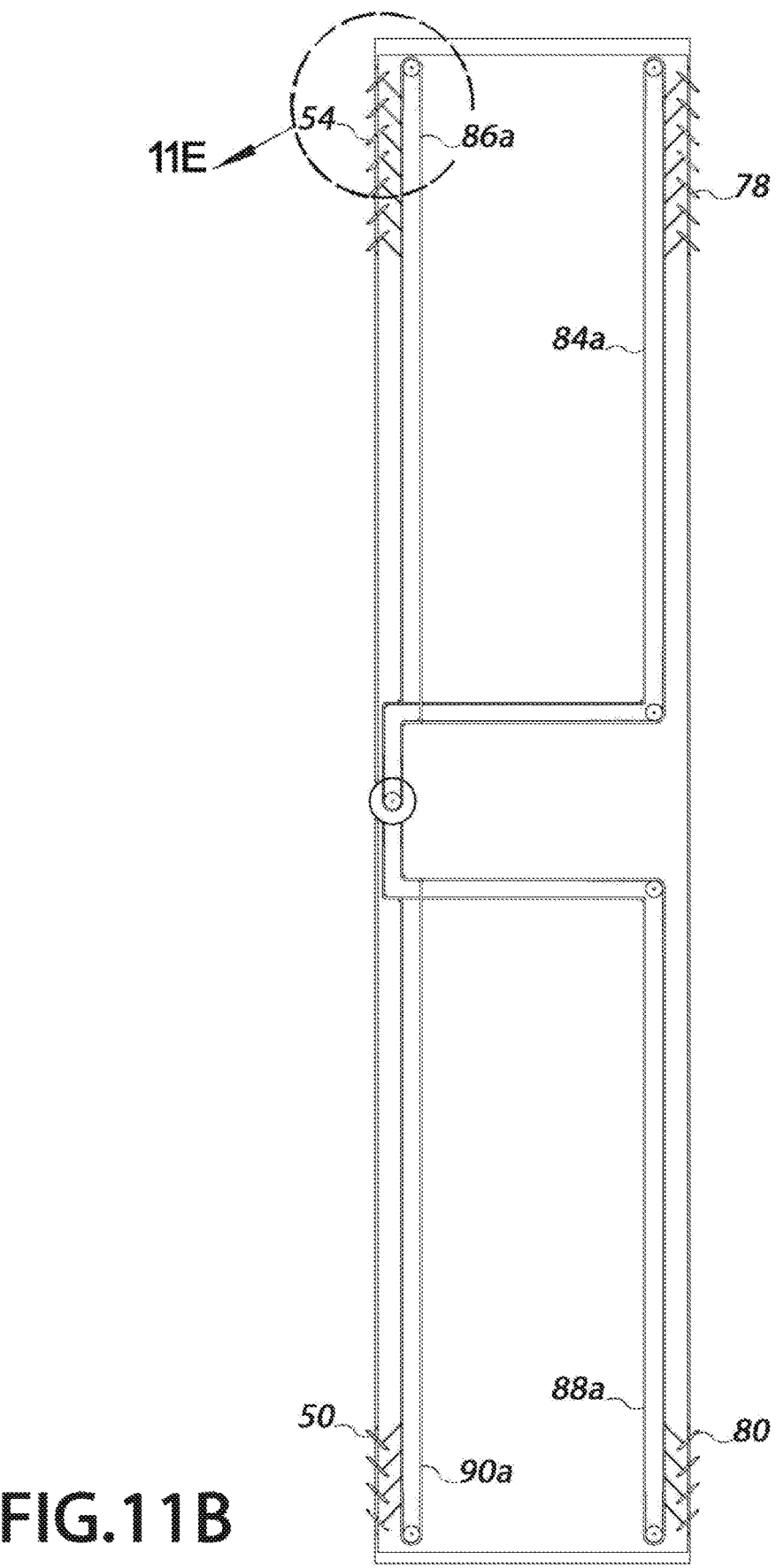
Figure 11D:
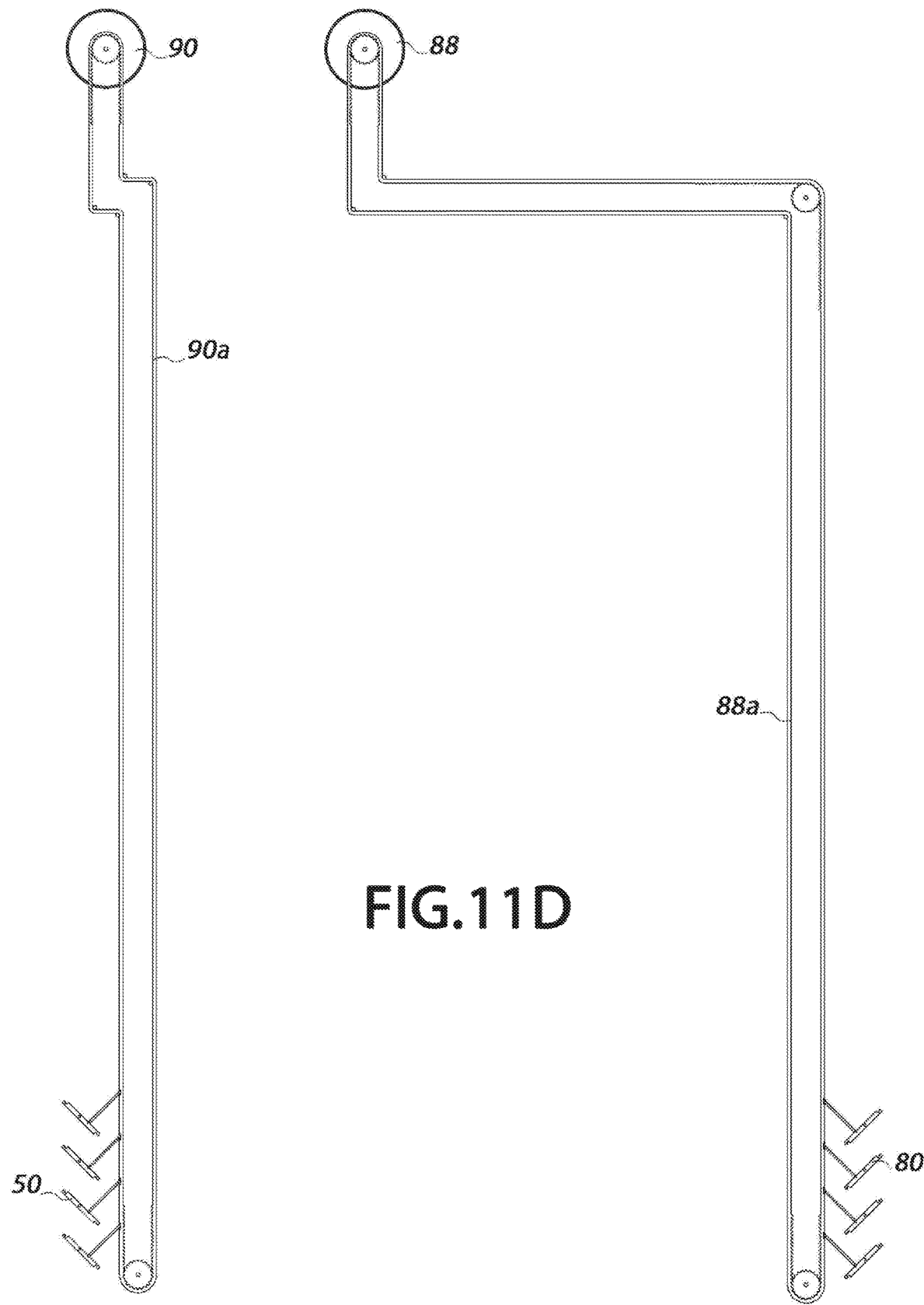
Figure 11E:
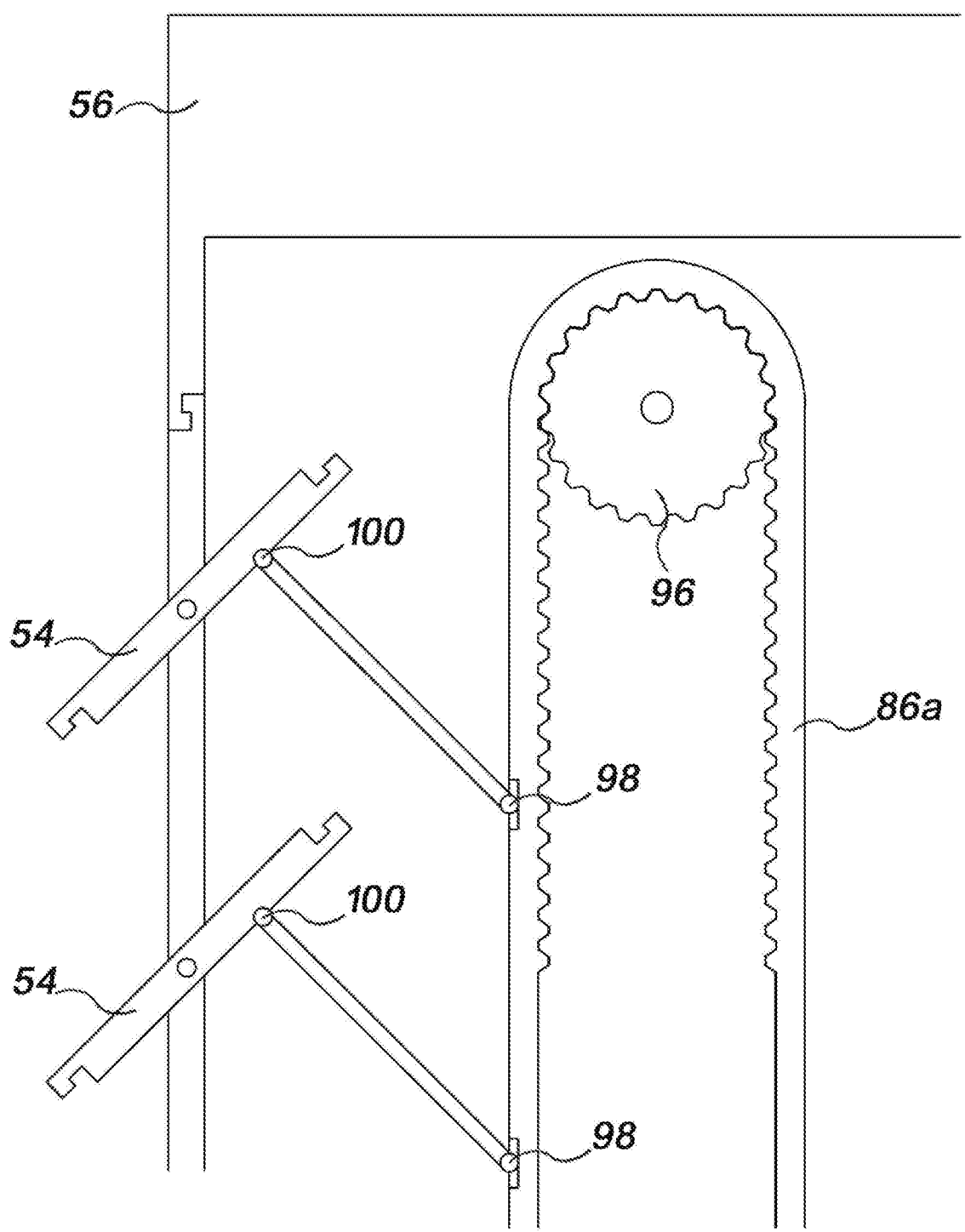

FIGS. 11A-11E illustrate the mechanisms for opening and closing the vents 50, 54, 78 and 80. In one embodiment, the user can open and/or close the vents 50, 54, 78 and 80 by moving their finger over rolling buttons 90, 86, 84, and 88 (shown in FIG. 11A), respectively. Each of the rolling buttons 84, 88, 86 and 90 is connected to its respective vents through one of a respective belts 84a, 88a, 86a, and 90a. In one embodiment, these belts are positioned inside the main frame 56. The connections between the rolling buttons 90, 86, 84, and 88, the belts 84a, 88a, 86a, and 90a and the vents 50, 54, 78 and 80 are shown in detail in FIGS. 11B-11D. As shown each belt goes around a rolling button and is then connected to each blade of the vents. This is illustrated in FIG. 11E, where belt 86a goes around a gear 96 to be hinges 98 which along with hinges 100 when moved can open and/or close each blade of the vents 54.

In a preferred embodiment of the improved solar heater and ventilator system, a distributor panel is used for a variety of functions including blowing hot air inside the building, increasing the temperature of the heated air, filtering the air, and storing electric energy. One embodiment of such a distributor panel is illustrated in FIG. 7. As shown, the distributor panel includes a fan 76 (also shown in FIG. 6B) which is used, in one embodiment, to force the heated air into the building through the vents 54. In one embodiment, the fan 76 includes Nano membranes for filtering the heated air before it gets released into the building. The distributor panel also includes electric elements 82 which store electric energy generated by the collectors 12 which are made of solar cells. The stored energy may be used to heat up the elements 82 which in turn can heat up the air before it exits into the building. This is particularly useful at night or during cloudy days where the energy from the sun is limited. By using the previously stored energy, air could continue to be heated.

Accordingly, the solar heater and ventilator system is a multi-functional device that can be used in a variety of ways to provide heat, produce and store electricity, and provide natural ventilation. The device is easy and inexpensive to operate, as does not require any external electricity. The functionality of the device can easily be changed with simple touches of buttons.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A multi-functional solar heater and ventilator comprising:
    a main frame;
    a plurality of cubes, each cube comprising a rotatable collector and one or more glass panels, each glass panel being housed within a movable window panel and the rotatable collector being connected to the movable window panel;
    a distributor panel connected to the main frame;
    wherein:
        the main frame houses the plurality of cubes,
        the rotatable collector is configured to generate heat,
        the cubes are configured to create a closed internal space for heating and an open passageway for ventilation, and
        the collector is configured to move responsive to movements of the movable window panels.

2. The multi-functional solar heater and ventilator of claim 1, further comprising at least one handle configured to rotate one or more of the plurality of cubes.

3. The multi-functional solar heater and ventilator of claim 2, wherein each of the at least one handles is configured to rotate one column of cubes.

4. The multi-functional solar heater and ventilator of claim 2, wherein one of the at least one handles is configured to rotate at least two columns of cubes.

5. The multi-functional solar heater and ventilator of claim 1, further comprising two interlocking gears configured to rotate one or more belts, the one or more belts causing a movable window panel to move.

6. The multi-functional solar heater and ventilator of claim 5, wherein once rotated, the one or more belts move one or more levers which in turn rotate one of the plurality of cubes.

7. The multi-functional solar heater and ventilator of claim 1, wherein the rotatable collector is made from a photovoltaic material for generating electricity.

8. The multi-functional solar heater and ventilator of claim 1, wherein the distributor panel includes a fan for directing heated air to flow out through one or more vents.

9. The multi-functional solar heater and ventilator of claim 1, further comprising a plurality of sets of vents configured to regulate air flow and temperate.

10. The multi-functional solar heater and ventilator of claim 9, wherein each set of the plurality of sets of vents is configured to be opened or closed separately.

11. The multi-functional solar heater and ventilator of claim 10, further comprising a rolling buttons for opening or closing each set of the plurality of sets of vents.

12. The multi-functional solar heater and ventilator of claim 10, further comprising a plurality of gears and belts configured to open and close each set of the plurality of sets of vents.

13. The multi-functional solar heater and ventilator of claim 7, wherein the rotatable collector is made from a solar cell.

14. The multi-functional solar heater and ventilator of claim 13, wherein the distributor panel includes an electric element that stores electric energy generated by the rotatable collector.

15. The multi-functional solar heater and ventilator of claim 13, wherein the electric energy stored in the electric element is used to provide heating during a time when solar energy is limited or unavailable.

16. The multi-functional solar heater and ventilator of claim 8, wherein the fan includes a filter for filtering the heated air.

\* \* \* \* \*